US008996471B2

(12) United States Patent  
Greenberg et al.

(10) Patent No.: US 8,996,471 B2
(45) Date of Patent: Mar. 31, 2015

(54) METHOD AND APPARATUS FOR PROVIDING HELP CONTENT CORRESPONDING TO THE OCCURRENCE OF AN EVENT WITHIN A COMPUTER

(75) Inventors: Steven M. Greenberg, Seattle, WA (US); Jeffrey E. Larsson, Kirkland, WA (US); Kevin J. Fischer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1296 days.

(21) Appl. No.: 11/638,802

(22) Filed: Dec. 14, 2006

(65) Prior Publication Data

US 2007/0180335 A1    Aug. 2, 2007

Related U.S. Application Data

(63) Continuation of application No. 10/304,257, filed on Nov. 26, 2002, now Pat. No. 7,158,965.

(51) Int. Cl.
*G06F 7/00* (2006.01)
*G06F 9/44* (2006.01)

(52) U.S. Cl.
CPC ....... *G06F 9/4446* (2013.01); *Y10S 707/99945* (2013.01); *Y10S 707/99933* (2013.01)
USPC .................... 707/687; 707/699; 707/999.104; 707/999.003

(58) Field of Classification Search
USPC ............. 707/104.1, 100, 10, 705, 999.101, 707/999.102, 687, 699
See application file for complete search history.

(56) References Cited

U.S. PATENT DOCUMENTS

| | | | |
|---|---|---|---|
| 5,740,354 A | 4/1998 | Ben-Natan et al. | 395/183.21 |
| 5,790,779 A | 8/1998 | Ben-Natan et al. | 395/183.15 |
| 5,813,006 A * | 9/1998 | Polnerow et al. | 1/1 |
| 5,845,120 A | 12/1998 | Reddy et al. | 717/125 |
| 5,850,388 A * | 12/1998 | Anderson et al. | 370/252 |
| 5,877,757 A | 3/1999 | Baldwin et al. | 715/705 |
| 5,919,247 A * | 7/1999 | Van Hoff et al. | 709/217 |
| 5,944,839 A | 8/1999 | Isenberg | 714/26 |
| 5,982,365 A | 11/1999 | Garcia et al. | 715/705 |
| 5,983,364 A | 11/1999 | Bortcosh et al. | 714/25 |
| 6,026,500 A | 2/2000 | Topff et al. | 714/26 |
| 6,208,338 B1 | 3/2001 | Fischer et al. | 715/705 |

(Continued)

OTHER PUBLICATIONS

Khosh-Khui, S.A., "Electronic Error Reporting Via Internet in the VAX Environment," *OCLC Systems & Services*, 1995, vol. 11, No. 1, p. 27-38.

(Continued)

*Primary Examiner* — Eliyah S Harper
(74) *Attorney, Agent, or Firm* — Steve Crocker; Jim Ross; Micky Minhas

(57) ABSTRACT

A method and apparatus are provided for displaying help content corresponding to the occurrence of an event occurring within a computer. An alert help data file is periodically downloaded at a client computer. When a program alert occurs within a client computer, the alert help data file is searched to identify help content corresponding to the particular occurrence of the alert. An alert identifier may be uniquely assigned to each alert to assist in locating the corresponding help content. Moreover, an assert tag and a function result value may also be utilized to define and locate particular help content. Once located, the help content may be displayed to a user.

12 Claims, 13 Drawing Sheets

(56) References Cited

U.S. PATENT DOCUMENTS

| | | | |
|---|---|---|---|
| 6,209,006 B1 | 3/2001 | Medl et al. | 715/501.1 |
| 6,223,171 B1* | 4/2001 | Chaudhuri et al. | 707/718 |
| 6,236,989 B1 | 5/2001 | Mandyam et al. | 707/4 |
| 6,339,436 B1* | 1/2002 | Amro et al. | 715/714 |
| 6,356,887 B1 | 3/2002 | Berenson et al. | 707/2 |
| 6,565,608 B1 | 5/2003 | Fein et al. | 715/501.1 |
| 6,658,598 B1 | 12/2003 | Sullivan | 714/25 |
| 6,973,620 B2 | 12/2005 | Gusler et al. | 715/708 |
| 6,983,271 B2* | 1/2006 | Morrow et al. | 1/1 |
| 7,010,593 B2* | 3/2006 | Raymond | 709/224 |
| 7,370,360 B2* | 5/2008 | van der Made | 726/24 |
| 2002/0078048 A1* | 6/2002 | High et al. | 707/8 |
| 2002/0078142 A1 | 6/2002 | Moore et al. | 709/203 |
| 2002/0082792 A1* | 6/2002 | Bourde et al. | 702/107 |
| 2002/0118220 A1* | 8/2002 | Lui et al. | 345/709 |
| 2002/0165862 A1* | 11/2002 | Richards et al. | 707/9 |
| 2002/0188612 A1* | 12/2002 | Yu et al. | 707/100 |
| 2003/0004923 A1* | 1/2003 | Real et al. | 707/1 |
| 2003/0028522 A1* | 2/2003 | Collins-Thompson et al. | 707/3 |
| 2003/0122859 A1* | 7/2003 | Aggarwal et al. | 345/708 |
| 2004/0018831 A1* | 1/2004 | Majmundar et al. | 455/419 |

OTHER PUBLICATIONS

Kerchner, D.J., Overlapping Development: The Continuous Maintenance Phase, Sessions Presented at Northcon/85 Conference Record, Oct. 1985, p. 5/1-1-6.

Yamada, S., Osaki, S., "A Reliability model on a Software Error Detecton Process," *Transactions of the Information Processing Society of Japan*, May 1983, vol. 24, No. 3, p. 376-378.

Murthy, S., "How to Collect More Reliable Defect Reports," Nineteenth Annual Pacific Northwest Software Quality Conference, Oct. 2001, p. 279-293.

Morin, R., "Distributed Quality Assurance," *UNIX Review*, Sep. 1993, vol. 11, No. 9, p. 107-108.

U.S. Appl. No. 09/559,123, entitled "Method and Apparatus for Displaying Computer Program Errors as Hypertext," filed Apr. 26, 2000; Inventor: William R. Softky.

U.S. Appl. No. 09/570,664, entitled "Method and System for Categorizing Failures of a Program Module," filed May 15, 2000; Inventors: Kirk A. Glerum, Matthew J. Ruhlen, Eric A. LeVine, Rob M. Mensching, Charles S. Walker.

U.S. Appl. No. 09/570,621, entitled "Method and System for Handling an Unexpected Exception Generated by an Application," filed May 15, 2000; Inventors: Matthew J. Ruhlen, Michael R. Maracelais, Brian T. Hill.

U.S. Appl. No. 09/570,825, entitled "System and Method for Handling a Failure Reporting Conversation," filed May 15, 2000; Inventors: Matthew J. Ruhlen, Kirk A. Glerum.

U.S. Appl. No. 09/571,629, entitled "Method and System for Reporting a Program Failure," filed May 15, 2000; Inventors: Kirk A. Glerum, Matthew J. Ruhlen, Eric A. LeVine, E. Peter Oosterhof.

U.S. Appl. No. 09/596,591, entitled "Method and System for Cyclic Crash Prevention During Application Startup," filed Jun. 19, 2000; Inventors: Michael R. Maracelais, Brian T. Hill, Eric A. LeVine, Steven Miles Greenberg.

U.S. Appl. No. 09/588,165, entitled "Method and System for Recovering Information During a Program Failure," filed Jun. 5, 2000; Inventors: Kevin Joseph Fischer, Eric A. LeVine, Brian T. Hill, Michael R. Marcaelais, Jeffrey Larsson.

U.S. Appl. No. 09/602,284, entitled "Method and System for Reporting Failures of a Program Module in a Corporate Environment," filed Jun. 23, 2000; Inventors: Kirk A. Glerum, Matthew J. Ruhlen.

U.S. Appl. No. 09/602,457, entitled "Method and System for Repairing Corrupt Files and Recovering Data," filed Jun. 23, 2000; Inventors: Kevin Fisher, Robert Coffen, Eric Snyder, Jeff Larsson.

\* cited by examiner

METHOD AND APPARATUS FOR PROVIDING HELP CONTENT CORRESPONDING TO THE OCCURRENCE OF AN EVENT WITHIN A COMPUTER

RELATED APPLICATIONS

This is a Continuation Application of U.S. application Ser. No. 10/304,257 entitled "Method and Apparatus for Providing Help Content Corresponding to the Occurrence of an Event Within a Computer" filed Nov. 26, 2002, which is incorporated herein by reference.

TECHNICAL FIELD

The present invention relates generally to providing help content within a computer system and, more specifically, to providing help content within a computer system that corresponds to the occurrence of an event within the computer.

BACKGROUND OF THE INVENTION

One of the most important stages in the software development cycle is the debugging that occurs after a software product has shipped. This stage is important because the experiences of millions of users of the software product may be utilized during this stage to isolate program errors, identify frequently or infrequently used features, and to generally make the software product better. In order to capitalize on the body of user experience with the software product, however, it is necessary to obtain data from users and to route this data to the software developer.

Prior to the widespread adoption and use of the Internet, it was very difficult for software developers to obtain quality data regarding how a software product performs for a large number of users. Now, however, the Internet connects millions of users with the developers that create and debug the software they use. The Internet, therefore, allows data regarding the operation of a software product to be sent from a computer user to the developer of the product. The data may then be utilized by the developer to fix errors, also called "bugs," in the program, to change the way the program operates by adding or removing features, and to otherwise improve the program. However, current systems for transmitting this data from a user to a software developer suffers from several drawbacks that reduce their effectiveness.

Current systems for reporting data regarding the operation of a software product generate event reports in response to the occurrence of an event within program code. For instance, an event report may be generated when an error occurs in the program code, when an unhandled exception is generated by the program code, when a particular line of code is encountered, or under other circumstances. Data that may assist the developer in understanding the event and in modifying the program code to ensure that it does not occur again is typically included in the event report. For instance, data describing the state of the computer when the event occurred may be included along with other data in the event report.

When a large number of event reports regarding the occurrence of a particular event are obtained, this data may be utilized by developer to understand the events that have occurred and to modify the program code. However, the previous systems for reporting the occurrence of events cannot obtain this information to help a user of the computer on which the event occurred unless the user elects to send an event report. As a result, the amount of help information provided to a user when a particular error or other type of event occurs is typically very limited unless the user elects to send an event report. However, detailed help should be available to a user even if the user elects not to send an error report. There is a need, therefore, for a system that can utilize the reported event data to provide an additional level of help content to a user regarding the occurrence of the event even when the user elects not to send an event report for a particular error.

It is with respect to these considerations and others that the present invention has been made.

SUMMARY OF THE INVENTION

In accordance with the present invention, the above and other problems are solved by a method of providing help content associated with the occurrence of an event occurring with a computer. The method allows users to receive additional help content regarding the occurrence of an alert or other type of event on their computer without sending an error report. According to the method, a help file comprising help content associated with one or more parameters uniquely identifying events with the computer is periodically retrieved and stored on the computer. When an event occurs, a determination is made as to whether help content associated with the particular event is stored at the computer and may be provided. If a user requests help regarding the event, the particular help content is identified based on the parameters associated with the event. Help content may then be provided to the user that is more detailed than previously available.

In accordance with other aspects of the invention, specific help content may be associated with various occurrences of a program alert within an executable program module. A program alert is an error condition that causes a dialog box to be displayed to user with a notification or error message. Each alert generated by a particular program is assigned a unique alert identifier. The alert identifier may be utilized to provide specific help content regarding the alert. Additionally, a very granular level of help detail may be provided by locating the help content based not only on the alert identifier, but also upon an assert event occurring just prior to the generation of the alert, a function result generated concurrently with the alert, or both parameters.

In accordance with still other aspects, the present invention relates to a data structure for identifying help content associated with a particular event. In particular, the data structure includes a first resource storing one or more parameters uniquely identifying an occurrence of an event and a parameter identifying help content contained within a second resource corresponding to the event. The data structure also includes a second resource storing help content corresponding to the particular occurrence of one or more events. The one or more parameters may correspond to an alert identifier uniquely identifying a program alert, an assert tag uniquely identifying the occurrence of an assert prior to the occurrence of the program alert, a function result generated concurrently with the occurrence of the program alert, or a combination of these parameters.

The invention may be implemented as a computer process, a computing system or as an article of manufacturer such as a computer program product or computer readable media. The computer program product may be a computer storage media readable by a computer system and encoding a computer program of instructions for executing a computer process. The computer program product may also be a propagated signal on a carrier readable by a computer system and encoded with a computer program of instructions for executing a computer process.

These and other various features as well as advantages which characterize the present invention will be apparent from a reading of the following detail description and a view of the associated drawings.

DETAILED DESCRIPTION OF THE INVENTION

Figure 1:
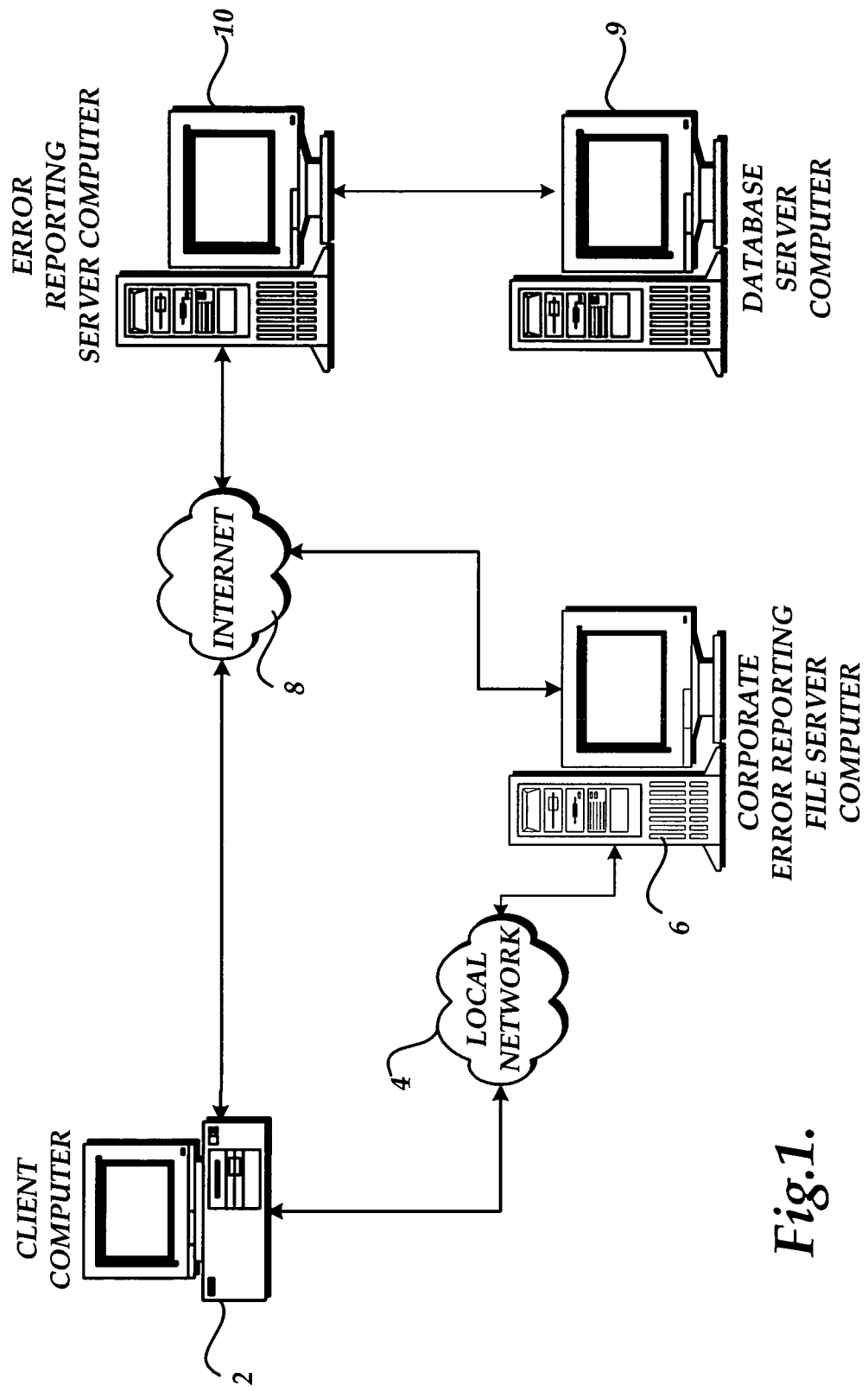
FIG. 1 is a network diagram showing an illustrative operating environment for various embodiments of the invention.

Referring now to the drawings, in which like numerals represent like elements through the several figures, aspects of the present invention and the illustrative operating environment will be described. In particular, FIG. 1 shows an illustrative operating environment for various embodiments of the present invention. As shown in FIG. 1, a client computer 2 is utilized in the various embodiments of the invention. The client computer comprises a standard desktop or server computer that may be used to execute one or more program modules. The client computer 2 is also equipped with program modules for generating error reports in response to events occurring within the client computer 2. Event reports may be generated in response to unhandled exceptions, asserts, program alerts, program errors, and other types of events.

As will be described in greater detailed below, the client computer 2 is also operative to transmit the error reports to a corporate error reporting ("CER") file server computer 6 available through a local area network ("LAN") 4. The CER file server computer 6 comprises a server computer maintained and accessible through the LAN 4 to the client computer 2. The CER file server computer 6 receives the error reports from the client computer 2, stores the reports, and may subsequently forward the error reports to the error reporting server computer 10. A policy may be set at the client computer 2 instructing the client computer 2 to transmit error reports to the CER file server computer 6.

A policy also may be set at the client computer 2 instructing the client computer 2 to transmit error reports through the Internet 8, or other type of distributed computing network, to the error reporting server computer 10. The error reporting server computer 10 comprises a server computer maintained typically by a developer of the software application or other type of program for receiving error reports. The error reports may assist the developer in correcting errors occurring within the client computer 2.

As will also be described in greater detail below, the client computer 2 is also operative to periodically retrieve from the error reporting server computer 10 a remote control file that identifies to the client computer 2 the particular events that should be reported. The remote control file also identifies to the client computer 2 the type of data that should be collected when an event occurs. Moreover, the remote control file identifies to the client computer 2 a date and time after which data should not be collected for each particular event.

As will be described in greater detail below, the client computer 2 periodically retrieves the remote control file from the error reporting server computer 10. When a reportable event occurs within the client computer 2, the client computer 2 consults the remote control file to determine if the event should be reported. If the event is to be reported, the client computer 2 stores data identified by the remote control file contemporaneously with the occurrence of the event. The data may then be transmitted or queued as an event report for subsequent transmission to the error reporting server computer 10. Additional details regarding the format and structure of the remote control file and the functions performed by the client computer 2 when utilizing the remote control file to report events will be described in greater detail below.

According to one embodiment of the invention, the client computer 2 is operative to periodically obtain from the error reporting server computer 10 a help file that includes help content associated with one or more parameters uniquely identifying an event within the client computer 2. A copy of the help file may also be installed on the client computer 2 when an application program is installed. When an event occurs within the client computer 2, such as a program alert, the help file is consulted to determine whether help content exists that is associated with the particular event that occurred. If the help content exists, the help content may be displayed to a user of the client computer 2. As will be described in greater detail below, help content may be associated with a particular event by keying the help content on an alert identifier, a function result, and an assert tag identifying an assert occurring just prior to the generation of the program alert. Additional details regarding the use of the alert help data file by the client computer 2 will be provided below with respect to FIGS. 10-13.

Figure 2:
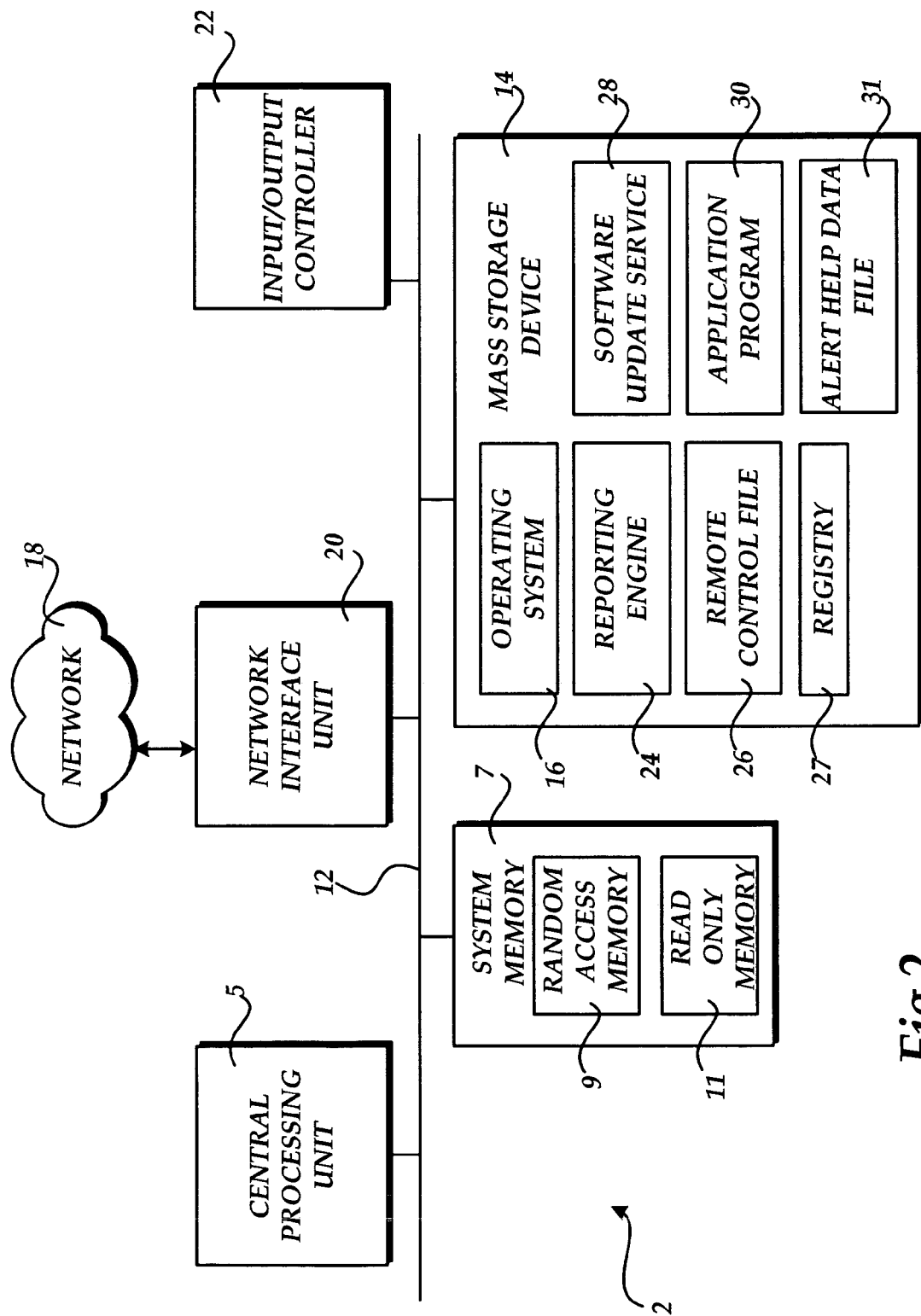
FIG. 2 is a computer architecture diagram showing a computer architecture for a client computer provided by various embodiments of the invention.

FIG. 2 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 2, an illustrative computer architecture for a client computer 2 for practicing the various embodiments of the invention will be described. The computer architecture shown in FIG. 2 illustrates a conventional desktop or server computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and program modules for reporting events occurring within the client computer 2.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the client computer 2 may operate in a networked environment using logical connections to remote computers through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a reporting engine program module 24. The reporting engine 24 contains functionality for generating error reports, queuing the error reports, and transmitting the error reports to either the CER file server 6 or the error reporting server computer 10. The reporting engine 24 may be utilized to perform these functions in response to an error or other type of event occurring within the operating system 16 or within an application program. Moreover, the reporting engine 24 may be utilized to perform these functions in response to other types of events such as the execution of a particular line of code on the CPU 5. The reporting engine 25 may also be explicitly called to perform some of its functions, such as dequeueing stored error reports.

The mass storage device 14 and RAM 9 may also include an application program 30. As known to those skilled in the art, the application program 30 may provide functionality for performing a variety of different functions such as word processing, creating and editing spreadsheets, and a virtually unlimited number of other types of functions. According to the embodiment of the invention described herein, the application program 30 is also operative to determine whether a reportable event has occurred during its execution. In response to determining that a reportable event has occurred, such as an assert or a program alert, the application program 30 is then operative to consult a remote control file 26 to determine whether the event should be reported. If the event is to be reported, the application program 30 will collect data identified by the remote control file 26 as an event report. The application program 30 will then call the reporting engine 24 to report the event in a queued mode of operation. Additional details regarding the operation of the application program 30 and its use of the remote control file 26 will be described in greater detail below.

According to one embodiment of the invention, the mass storage device 14 and RAM 9 also include a software update service program 28. As known to those skilled in the art, the software update service 28 comprises an executable program that is operative to periodically execute on the computer 2 and to determine whether various parts of the software stored on the computer 2 should be updated. The software update service 28 makes this determination by contacting an error reporting server computer 10 or other type of server computer via the Internet 8. If updates exist for various software components stored on the client computer 2, the software update service 28 is operative to retrieve these software components and store them on the mass storage device 14.

In the embodiments of the invention described herein, the software update service 28 is operative to periodically contact the error reporting server computer 10 to determine whether an updated version of the remote control file 26 is available. If an updated file is available, the software update service 28 retrieves the file and stores it in a location accessible to the application program 30. Additional details regarding the operation of the software update service 28 will be provided below with respect to FIG. 5.

According to one embodiment of the invention, the mass storage device 14 is also operative to store a registry 27. As known to those skilled in the art, the registry 27 comprises a non-volatile storage location for maintaining parameters and other flags regarding the operation of the operating system 16, the application program 30, and other software components executing on the computer 2. As will be described in greater detail below, the registry 27 is utilized herein to store flags relating to the location of the remote control file 26 and the time and date on which the software update service 28 should check for an updated version of the remote control file 26.

As described briefly above, the application program 30 is configured to identify various types of events and to call the reporting engine 24 in response to the occurrence of these events. For instance, the application program 30 may be configured to call the reporting engine 24 in response to the occurrence of an assert. As known to those skilled in the art, an assert comprises a flag placed within the program code of the application program 30 that, when executed, identifies a potential error condition. Asserts may be uniquely identified within the application program 30, or across two or more application programs, to uniquely identify the assert that has occurred. By transmitting data regarding the occurrence of the assert through the reporting engine 24 to the error reporting server computing 10, a developer of the application program 30 can troubleshoot, and potentially correct, problems within the application program 30.

As described briefly above, the application program 30 is configured to also identify the occurrence of a program alert. In response to the occurrence of a program alert, the application program 30 may be configured to call the reporting engine 24. As known to those skilled in the art, a program alert, also called an error message, is a modal dialog box which interrupts a user of the computer 2 and asks for some sort of input. For instance, a user may be asked whether they want to save changes in a document, maybe notified that a document could not be opened, or that a particular piece of data could not be located. It should be appreciated that program alerts may be generated in response to error conditions, but may also be generated in order to receive data from a user or to notify a user of a particular condition. In one specific embodiment of the invention described herein, program alerts comprise those messages which go through the LDoAlertTFCWAHrEX function utilized in the MICROSOFT OFFICE family of programs provided by the MICROSOFT CORPORATION, of Redmond, Wash.

According to one embodiment of the invention, the mass storage device 14 and the RAM 9 may also store an alert help data file 31. As will be described in greater detail below with respect to FIGS. 10-13, the alert help data file 31 contains help content associated with particular events that may occur within the client computer 2. In particular, the alert help data file 31 includes help content associated with various program alerts occurring within the application program 30. In order to associate the help content with the occurrence of a particular event, an alert identifier, a function result, and an assert tag may be utilized to uniquely identify an event and the corresponding help content. The help content then may be displayed to a user of the client computer 2. Additional details regarding the contents and structure of the alert help data file 31 will be provided below with respect to FIG. 10. Additional details regarding the use of the alert help data file 31 by the client computer 2 will be provided with respect to FIGS. 11-13.

Figure 3:
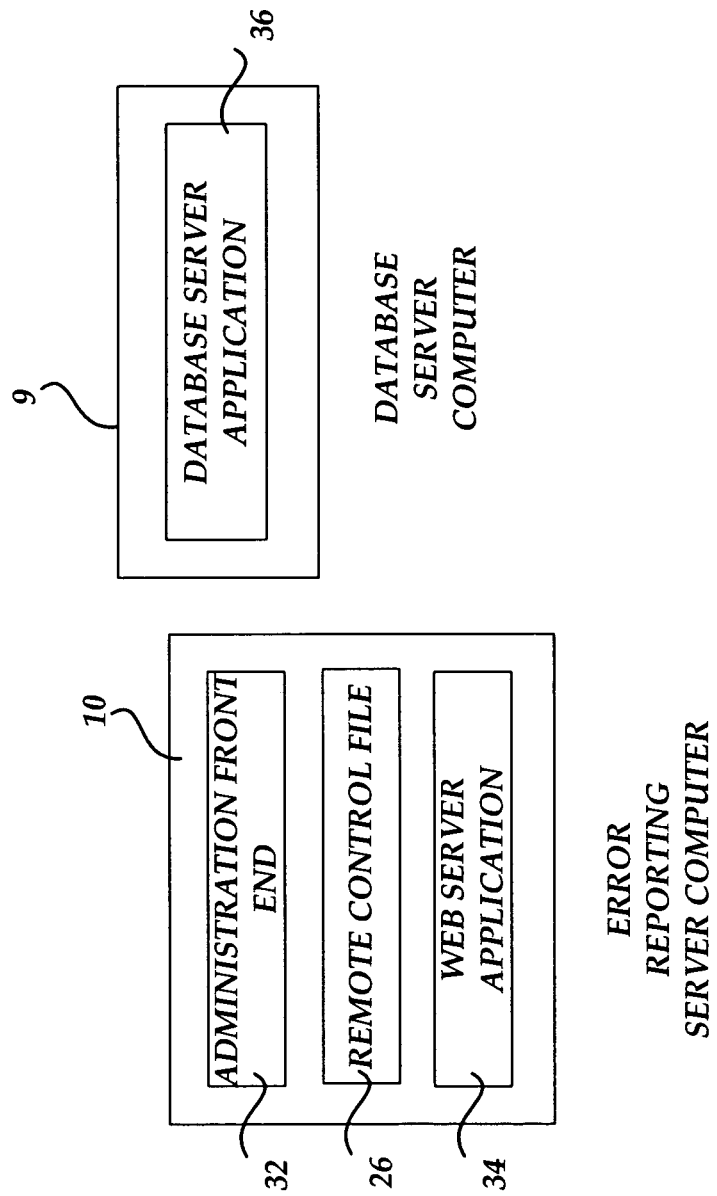
FIG. 3 is a software architecture diagram showing various software components utilized by an error reporting server computer and a database server computer provided according to various embodiments of the invention.

Turning now to FIG. 3, various software components utilized by the error reporting server computer 10 and the database server computer 9 will be described. In particular, as shown in FIG. 3, the error reporting server computer 10 maintains a remote control file 26. As discussed briefly above, the remote control file 26 is periodically retrieved from the error reporting server computer 10 by the client computer 2. Additional details regarding the format and structure of the remote control file will be provided below with respect to FIG. 4.

The error reporting server computer 10 also includes a Web server application 34. As known to those skilled in the art, the Web server application 34 is operative to receive and respond to requests for Web pages located on or accessible to the error reporting server computer 10. In one embodiment, the Web server application 34 is operative to provide access to an administration front end Web site 32. The administrative front end Web site 32 comprises a Web site accessible typically to developers of the application program 30 for customizing the contents of the remote control file 26. In particular, through the administrative front end 32, a developer may specify the types of errors or other events that should be reported by the application program. It should be appreciated that the administration front end Web site 32 and the remote control file may be stored on different computers.

The administration front end 32 may also allow a developer to specify the type of data that should be provided when an event occurs, and a date and time after which an event should not be reported. The data provided by the developer through the administration front end 32 may be communicated to the database server application 36 and stored in a database. A batch file process may also be provided for periodically generating a remote control file 26 from the database. The remote control file 26 may then be moved from the database server computer 9 to the error reporting server computer 10, where it is made available to the client computer 2. It should be appreciated that the various functions described herein as being performed by the error reporting server computer 10 and the database server computer 9 may be performed by the same computer system or by other systems not shown or described in FIG. 3.

According to one embodiment of the invention, the error reporting server computer 10 may also store an alert help data file 31. The alert help data file 31 may be periodically distributed to the client computer 2 using the software update server 28 or through other means, such as a through the distribution of a service pack. The alert help data file 31 may be customized based on error reports received from various client computers 2 to provide additional help content for specific occurrences of events within the application program 30 or other application programs. It should be appreciated that the alert help data file 31 may be hosted by the error reporting server computer 10 or other computer system. Moreover, it should be appreciated that a Web-based front-end may be provided for accessing the contents of the alert help data file 31 at the error reporting server computer 10 and updating its contents. Additional details regarding the alert help data file 31 will be provided below with respect to FIGS. 10-13.

Figure 4:
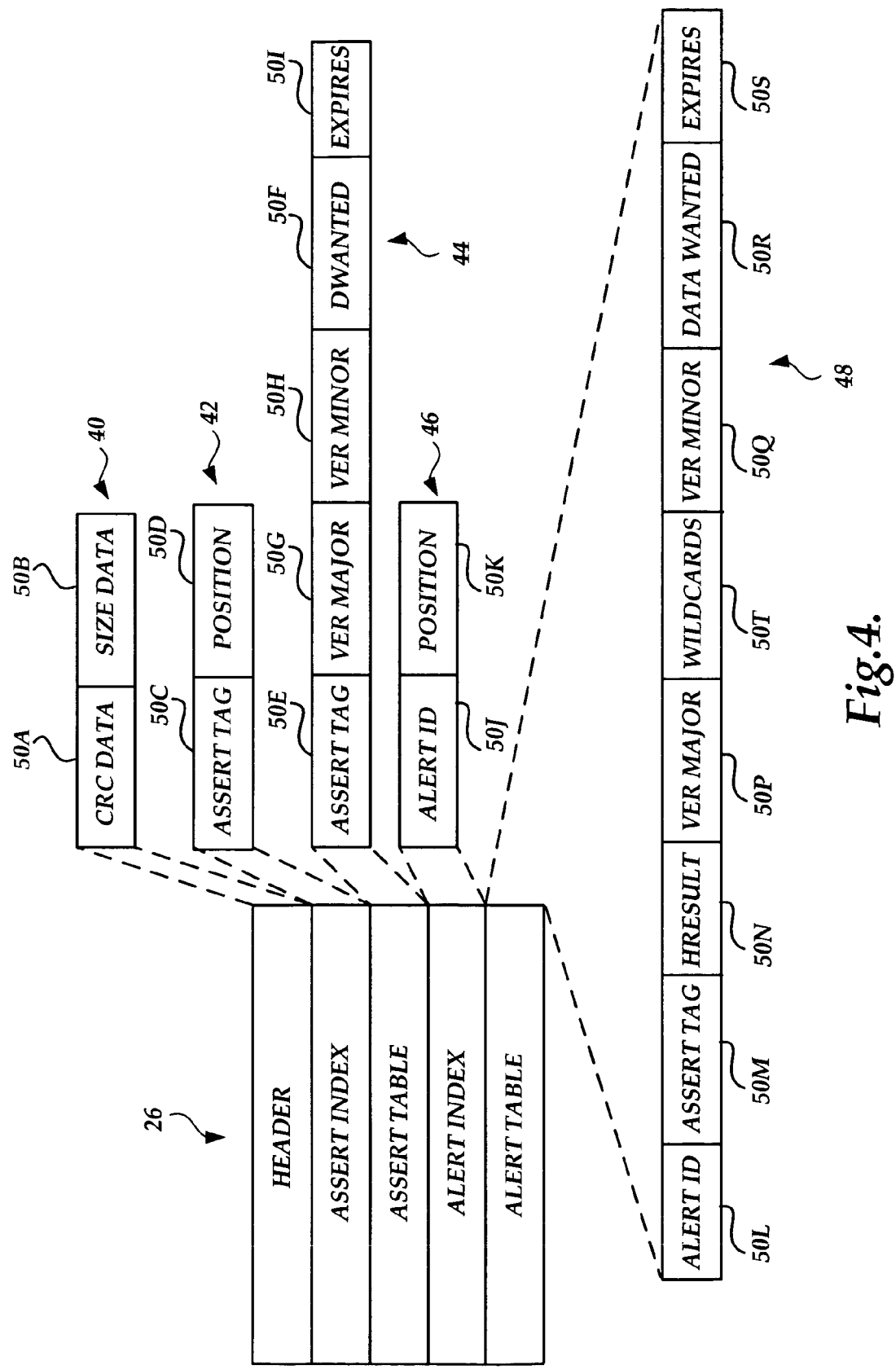
FIG. 4 is a data structure diagram illustrating the structure of a remote control file utilized in the various embodiments of the present invention.

Turning now to FIG. 4, additional details regarding the structure and contents of the remote control file 26 will be described. As shown in FIG. 4, the remote control file 26 comprises a header 40, an assert index 42, an assert table 44, an alert index 46, and an alert table 48. It should be appreciated that the remote control file 26 described herein is configured for remotely controlling the reporting of program asserts and program alerts. However, it should be appreciated that the format and structure of the remote control file 26 may be extended and applied to the remote control of reporting for any type of event.

As shown in FIG. 4, the header 40 includes cyclic redundancy check ("CRC") data 50A and size data 50B. As will be discussed in greater detail below, prior to utilizing the remote control file 26, a determination is made as to whether the component parts of the remote control file 26 are valid. This is performed by generating a CRC value for each of the component parts of the remote control file 26 and comparing the CRC data 58 to the generated CRC. Additionally, the sizes of the component parts of the remote control file 26 are identified and compared to the size data 50B. The remote control file 26 may be utilized if the CRC data 50A and the size data 50B match the generated CRC and size, respectively. If the CRC and size do not match, the remote control file 26 may be corrupt and is therefore not utilized.

The assert index 42 includes an assert tag field 50C and a position field 50D. The assert tab field 50C identifies a particular assert tag. As discussed above, asserts are identified by unique tags to identify the assert within an application or across multiple applications. The position field 50D identifies the location of the corresponding assert tag within the assert table 44. As will be described in greater detail below, the contents of the assert index 42 may be utilized to quickly locate a portion of the assert table 44 that may contain a desired entry.

The assert table 44 includes an assert tag field 50E, a data wanted field 50F, a major version field 50G, a minor version field 50H, and an expires field 50I. The assert tag field 50E includes the assert tags for each assert that should be reported. For each entry in the assert tag field 50E, the data field 50F identifies the type of data that should be collected when the assert occurs. In particular, the data wanted field 50F may identify that a minidump be collected, that a minidump sanitized to remove personally identifiable information (called a "microdump" herein) be collected, or that the minidump along with a heap should be collected.

The major version field 50G and minor version field 50H include version numbers for a software application program 30 in which the assert identified by the corresponding assert tag 50E must be generated. In this manner, asserts generated within different versions of the same application program 30 may be configured to generate different types of event reports. Alternatively, versions of the application program 30 may be configured so that one version generates an event report while another version of the application program 30 does not generate an event report for the same assert.

The assert table 44 also includes an expires field 50I. The expires field 50I includes a date and time after which the assert identified by the corresponding assert tag 50E should not be reported. As will be discussed in greater detail below, the expires field 50I is consulted prior to reporting the occurrence of an assert. If the date and time specified in the expires field 50I have expired, the assert will not be reported. The expires field 50I is useful to prevent reporting of events after which corresponding event reports would not be useful.

As discussed briefly above, the remote control file 26 is configured to remotely control the reporting of program alerts. As known to those skilled in the art, program alert is generated when an error condition is encountered by the program. Typically, a user interface dialog box or other type of notification is provided to the user at the time the alert occurs. In order to remotely control the reporting of alerts, each alert is assigned a unique alert identifier. The alert identifier uniquely identifies the occurrence of a particular program alert in a given application or a cross multiple application.

The alert index 46 stores an alert identifier field 50J and a position field 50K. The position field 50K identifies the position within the alert table 48 of the alert identifier specified in the field 50J. As will be discussed in greater detail below, by consulting the alert index 46 prior to searching the alert table 48, a desired alert identifier may be located quickly.

The alert table 48 includes an alert identifier 50L, an assert tag field 50M, an hresult field 50N, a major version field 50P, a minor version field 50Q, a data wanted field 50R, and an expires field 50S. When an alert is generated, the alert table 48 is consulted to determine whether the alert should be reported. If the alert that has occurred matches an entry in the alert identifier field 50L, the alert may be reported. Additionally, the circumstances under which an alert may be reported may be limited by consulting the contents of the assert tag field 50M and the hresult field 50N. The assert tag field 50M stores data regarding the last assert that occurred prior to the generation of the program alert. The hresult field 50M includes an error code that may be returned by a function. By reporting an alert only when the contents of the fields 50L, 50M, and 50N correspond exactly to the generated alert, or to a wildcard, the circumstances under which reporting occurs may be narrowed to a very specific event.

The alert table 48 also includes a major version field 50P and a minor version field 50Q. As with the major version field 50G and the minor version field 50H described above, these fields allow the same alert occurring in different versions of an application program 30 to be reported differently. The alert table 48 also includes a data wanted field 50R. If the corresponding alert identifier is to be reported, the data wanted field 50R specifies whether a microdump, a minidump, or a minidump and a heap should be collected when the event occurs. Moreover, the alert table 48 includes an expires field 50S that defines a date and time after which corresponding alert identifiers should not be reported.

It should be appreciated that the fields 50M and 50N may be populated with wildcards. As known to those skilled in the art, a wildcard indicates that the contents of a particular field matches all possible entries. For instance, a particular alert identifier may be specified in the alert identifier field 50L. The fields 50M and 50N may be populated with wildcards by making an appropriate entry in the wildcards field 50T. In this manner, an alert occurring matching the contents of the hresult field 50M will be reported regardless of the previously encountered assert, or version of the application program 30. Additional details regarding the use of the remote control file 26 for reporting the occurrence of events will be described in greater detail below with respect to FIGS. 6-9.

Figure 5:
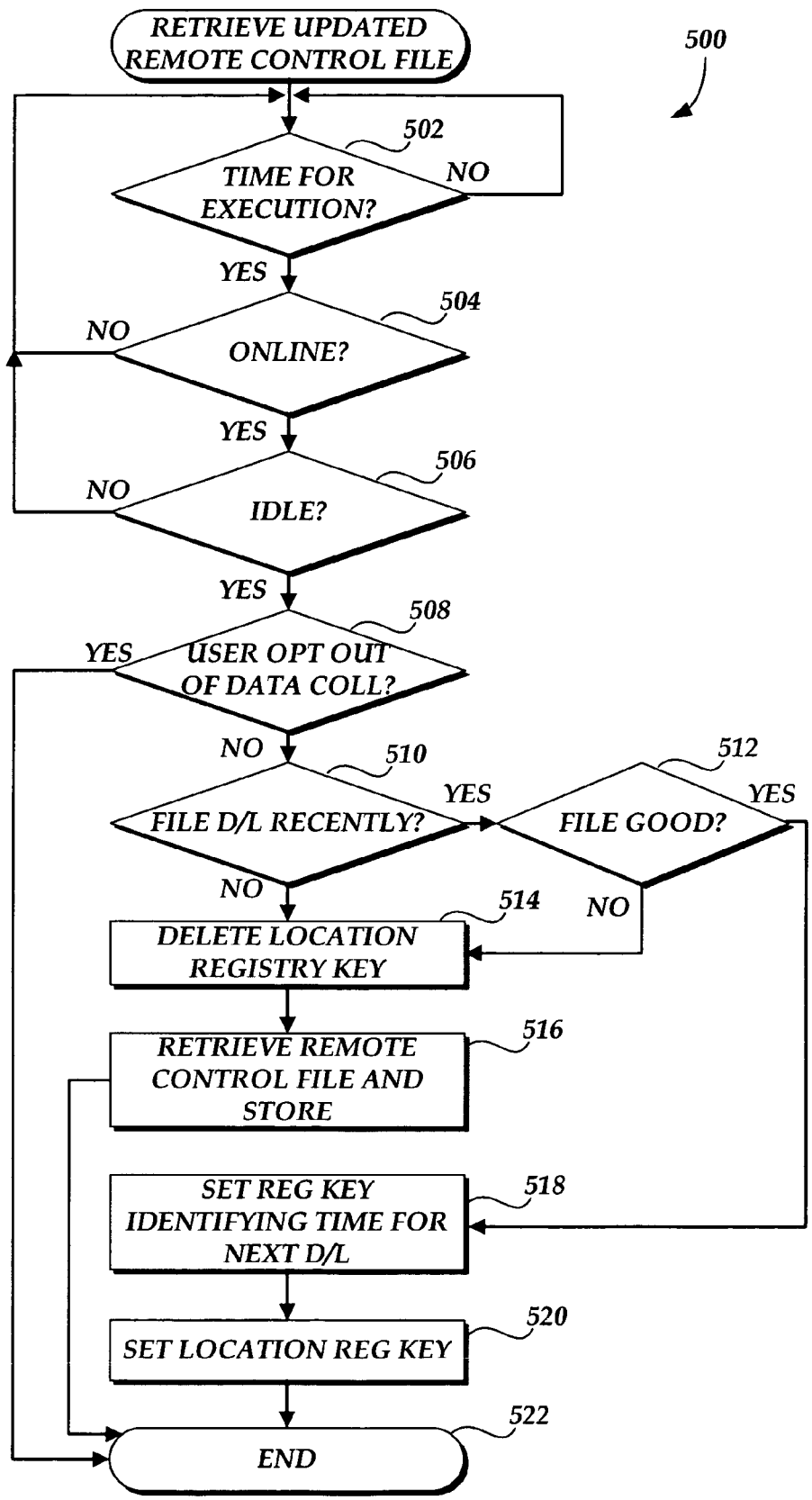
FIG. 5 is a flow diagram illustrating a process for periodically retrieving an updated remote control file utilized by a client computer in various embodiments of the invention.

Referring now to FIG. 5, an illustrative routine 500 will be described illustrating the operation of the software update service 28. As described briefly above, the software update service 28 is operative to periodically execute and download an updated version of the remote control file 26 if one is available. Accordingly, the routine 500 begins at block 502, where a determination is made as to whether the current time maintained by the client computer 2 is the appropriate time for the software update service 28 to execute. The software update service 28 maybe configured to execute by specifying a key in the registry 27. If the current time is not the time for execution, the routine 500 branches back to 502. If, however, the current time is the time for execution, the software update service 28 is executed and the routine 500 continues to block 504.

According to one embodiment of the invention, the software update service 28 only performs its functions if the client computer 2 is online and connected to a network 18 and the client computer 2 is idle. In this manner, a check for an updated remote control file 26 will only be performed if a network connection is available and if the computer is not performing other functions. Accordingly, at block 504, a determination is made as to whether the client computer is online. If the client computer is not online, the routine 500 branches back to block 502. If the client computer is online, the routine 500 continues to block 506 where a determination is made as whether the client computer is idle. If the client computer is not idle, the routine 500 branches back to block 502. However, if the client computer 2 is idle, the routine 500 continues to block 508.

At block 508, a determination is made as to whether the current user of the client computer 2 has indicated that they would not like data collected on the client computer 2. As discussed above, a user of the client computer 2 or an administrator may set a policy indicating that data not be collected. If such a policy has been set, the routine 500 branches from block 508 to block 522. It no such policy has been set, the routine 500 continues from block 508 to block 510.

At block 510, a determination is made as to whether the remote control file 26 has been downloaded recently. If the file has been downloaded recently, the routine 500 branches to block 512. At block 512, a determination is made as to whether the remote control file 26 is corrupted. This determination may be made based on verification of a digital signature or file size checks on the remote control file 26. If the file is not corrupted, there is no need to download an updated version of the remote control file 26. Accordingly, the routine 500 branches from block 512 to block 518, described below. However, if the file is corrupted, the routine 500 continues to block 514.

If, at block 510, it is determined that an updated remote control file 26 has not been downloaded recently, the routine 500 continues to block 514. At block 514, a key stored in the registry 27 identifying the location of the current remote control file 26 is deleted. By requiring accesses to the remote control file 26 to be made utilizing this key, and removing the key prior to downloading a new remote control file 26, accesses to the remote control file 26 while a new version is being downloaded can be avoided.

From block 514, the routine 500 continues to block 516, where the software update service 28 retrieves an updated version of the remote control file 26 from the error reporting server computer 10. A time period may be set to elapse prior to downloading the updated version of the remote control file 26. The software update service 28 stores the updated version of the remote control file 26 within the mass storage device 14. Once the updated remote control file 26 has been stored, the routine 500 to block 522, where it ends.

At block 518, a registry key identifying the time for downloading the next version of the remote control file 26 is set. The routine 500 then continues to block 520 where the software update service 28 resets the key contained in the registry 27 that identifies the location of the updated remote control file 26. The routine 500 then continues from block 520 to block 522, where it ends.

Figure 6:
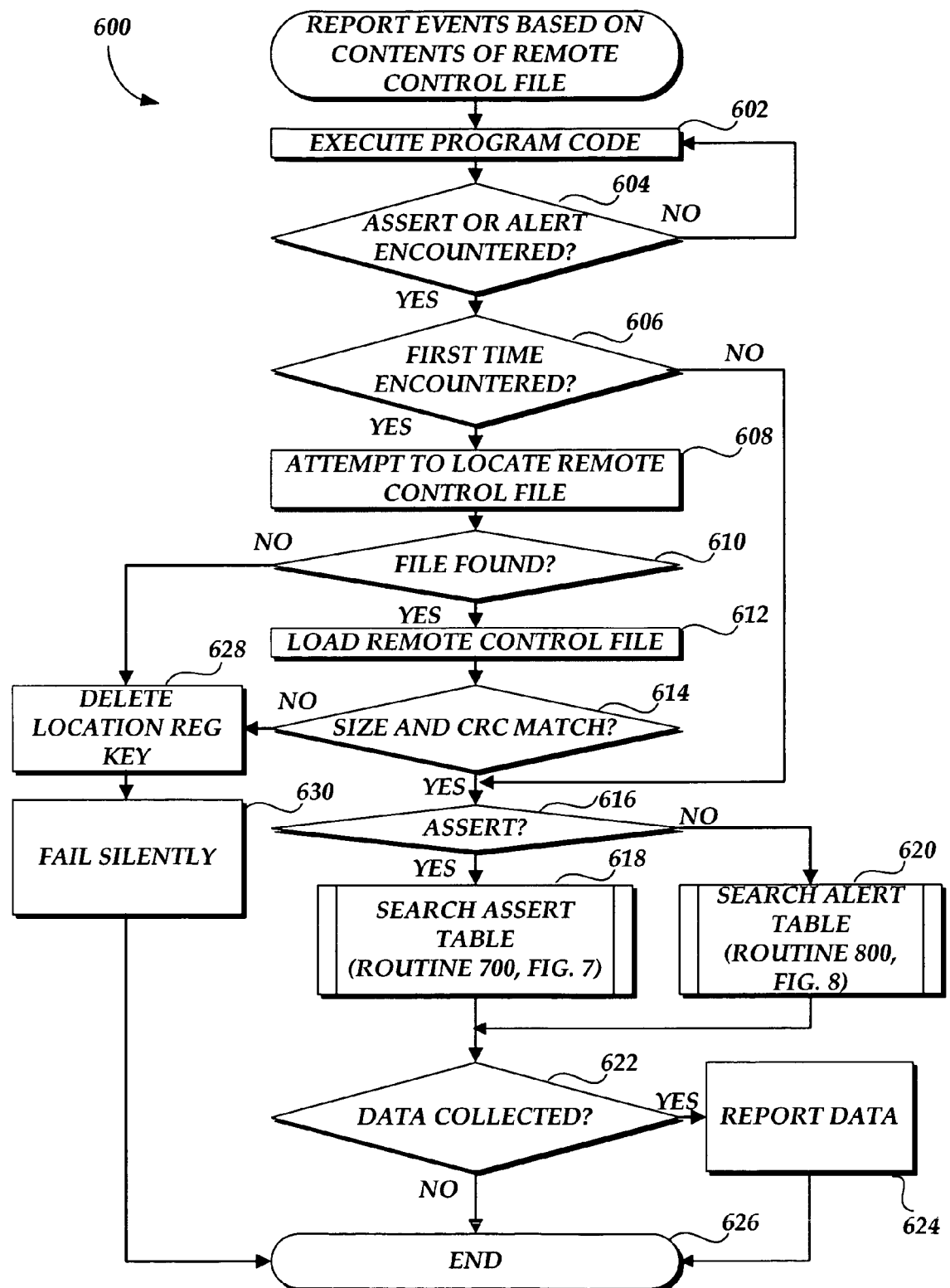
FIG. 6 is a flow diagram illustrating a routine for reporting the occurrence of events based on the contents of a remote control file as provided in one embodiment of the invention.

Referring now to FIG. 6, an illustrative routine 600 will be described for reporting events based on the contents of the remote control file 26. It should be appreciated that the functions illustrated in the routine 600 are performed by the application program 30 in the embodiment of the invention described herein. However, it should be further appreciated that the functions shown in FIG. 6 may be performed by other program modules, such as the operating system 16, or other types of program modules.

The routine 600 begins at block 602, where the program code of the application program 30 or other program module is executed. The routine then continues to block 604, where determination is made as to whether a reportable event has occurred. According to the various embodiments of the present invention described herein, a reportable event may comprise either the occurrence of an assert or the occurrence of a program alert. If either an assert or a program alert has occurred, the routine 600 continues from block 604 to block 606. If no reportable event has occurred, the routine 600 branches back to block 602 where the execution of the program code continues.

At block 606, a determination is made as to whether the occurrence of the event is the first occurrence of an event since the program module has been executing. This determination is made to ensure that the remote control file 26 is only loaded into memory one time during a particular program session. If the event is not the first event that has been encountered, the routine 600 branches from block 606 to block 616. If, however, the event is the first event that has been encountered during the program session, the routine 600 continues to block 608.

At block 608, an attempt is made to locate the remote control file 26 at the location specified by the registry key described above. At block 610, a determination is made as to whether the remote control file 26 was found at the specified location. If the file was not found at the specified location, the routine 600 branches to block 628 where the registry key specifying the location of the remote control file 26 is deleted. The routine 600 then continues from block 628 to block 630 where the routine fails silently. No notification is provided to user that reporting has failed. From block 630, the routine 600 continues to block 626, where it ends.

If, at block 610, the remote control file 26 was located, the routine 600 continues to block 612 where the remote control file 26 is loaded into the memory of the client computer 2. The routine 600 then continues to block 614, where a determination is made as to whether the size and CRC values for each of the component parts of the remote control file 26 match the size specified in the header 40. If the size and CRC do not match, the routine 600 branches to block 628. If, however, the size and CRC do match, the routine 600 continues to block 616.

At block 616, a determination is made as to whether the event that has occurred is the occurrence of an assert. If an assert has occurred, the routine 600 continues to block 618 where the assert table is searched for an entry indicating that the assert should be reported. If, at block 616, it is determined that an assert has not occurred, the routine 600 branches to block 620, where the alert table 48 is searched to identify whether or not the alert should be reported. Illustrative routines for searching the assert table and the alert table are described below with reference to FIGS. 7 and 8, respectively.

From blocks 618 and 620, the routine 600 continues to block 622, where a determination is made as to whether data was collected in response to the occurrence of the event. If data has been collected, the routine 600 branches to block 624, where the collected data is reported by the reporting engine 24. From block 624, the routine 600 continues to block 626, where it ends. If, at block 622, a determination is made that no data was collected in response to the occurrence of the event, the routine 600 continues to block 626, where it ends.

Figure 7:
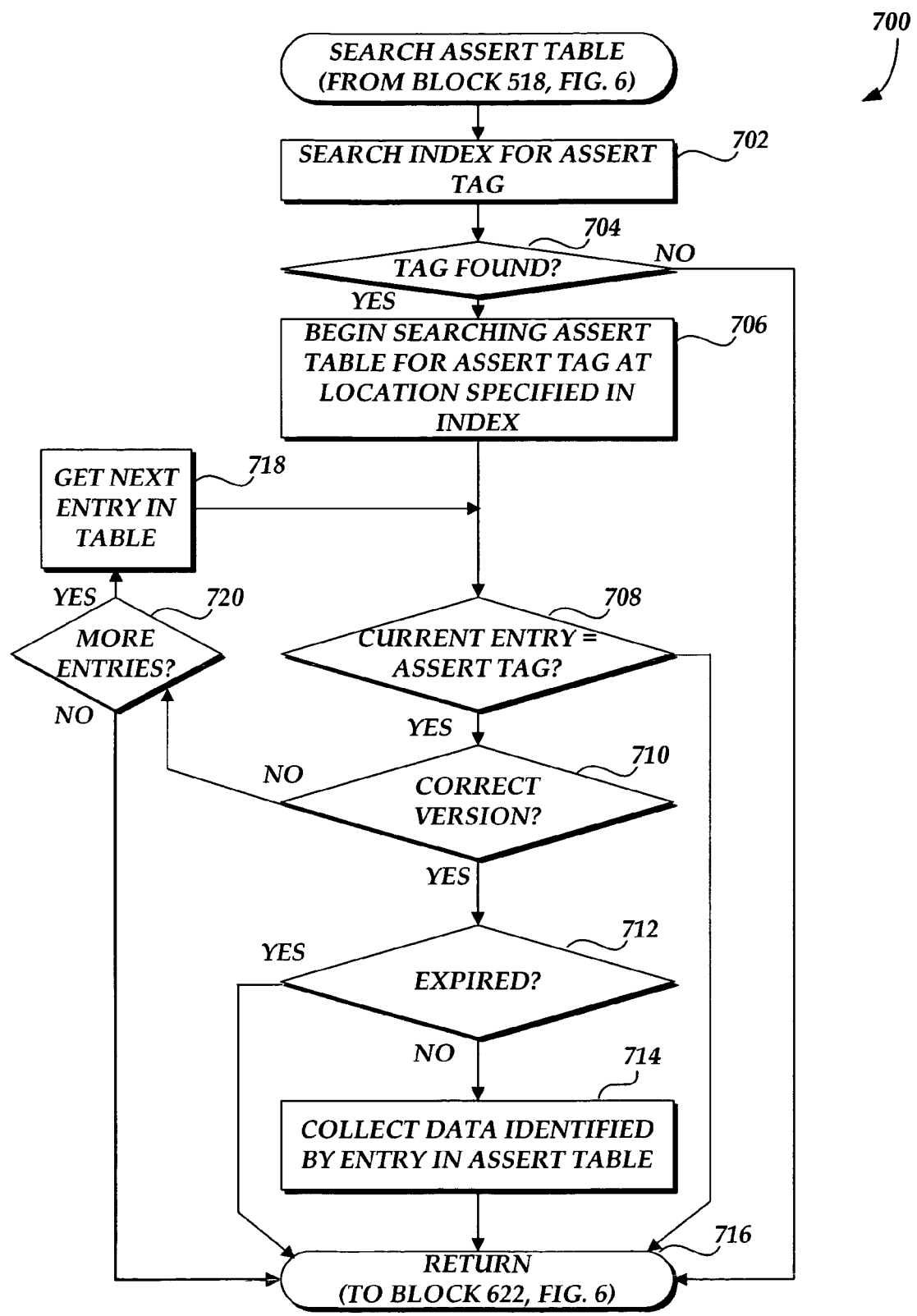
FIG. 7 is a flow diagram illustrating a routine for searching an assert table utilized to identify events that should be reported in one embodiment of the invention.

Referring now to FIG. 7, an illustrative routine 700 will be described for searching the assert table 44. The routine 700 begins at block 702, where the assert tag field 50c of the assert index 42 is searched for an entry having an assert tag identical to the assert that has recently occurred. The routine 700 then continues to block 704, where a determination is made as to whether such a tag was found. If such a tag was not found, the routine 700 branches to block 716, where it returns to block 622. If, however, a matching tag was found, the routine 700 continues to block 706.

At block 706, a search is begun within the assert table 44 for an entry in the assert tag field 50e matching the assert tag for the recently occurring assert. The search is begun at the position within the assert table 44 specified by the position field 50d of the assert index 42. From block 706, the routine 700 continues to block 708, where a determination is made as to whether the current entry in the assert table 44 has an assert tag field 50e matching the assert tag of the recently occurring assert. If the current entry does not match the assert tag, the routine 700 branches to block 720, where a determination is made as to whether more entries exist in the assert table 44. If no additional entries remain in the assert table 44 to be searched, the routine 700 branches from block 720 to block 716, where it returns to block 622. If additional entries exist, however, the routine 700 continues to block 718, where the next entry in the assert table is searched.

If, at block 708, a determination is made that the contents of the assert tag field 50e for the current entry matches the assert tag of the recently occurring assert, the routine 700 continues to block 710. At block 710, a determination is made as to whether the application program 30 in which the assert occurred matches the major and minor versions specified in the fields 50g and 50h. If the versions do not match, the routine 700 branches from block 710 to block 720. If, however, the versions match, the routine 700 continues to block 712.

At block 712, the date and time contained in the field 50I is compared to a current date and time maintained by the client computer 2. If the date and time contained in the field 50I is older than the current date and time, the entry in the assert table has expired and data for that entry should not be collected. Accordingly, if the date has expired, the routine 700 branches from block 712 to block 716, where the search is complete. However, if the date has not expired, the routine 700 continues to block 714, where data is collected for the assert as specified by the data wanted field 50F. The collected data is stored in a location accessible to the reporting engine 24. From block 714, the routine 700 continues to block 716, where it returns to block 622, described above with reference to FIG. 6.

Figure 8:
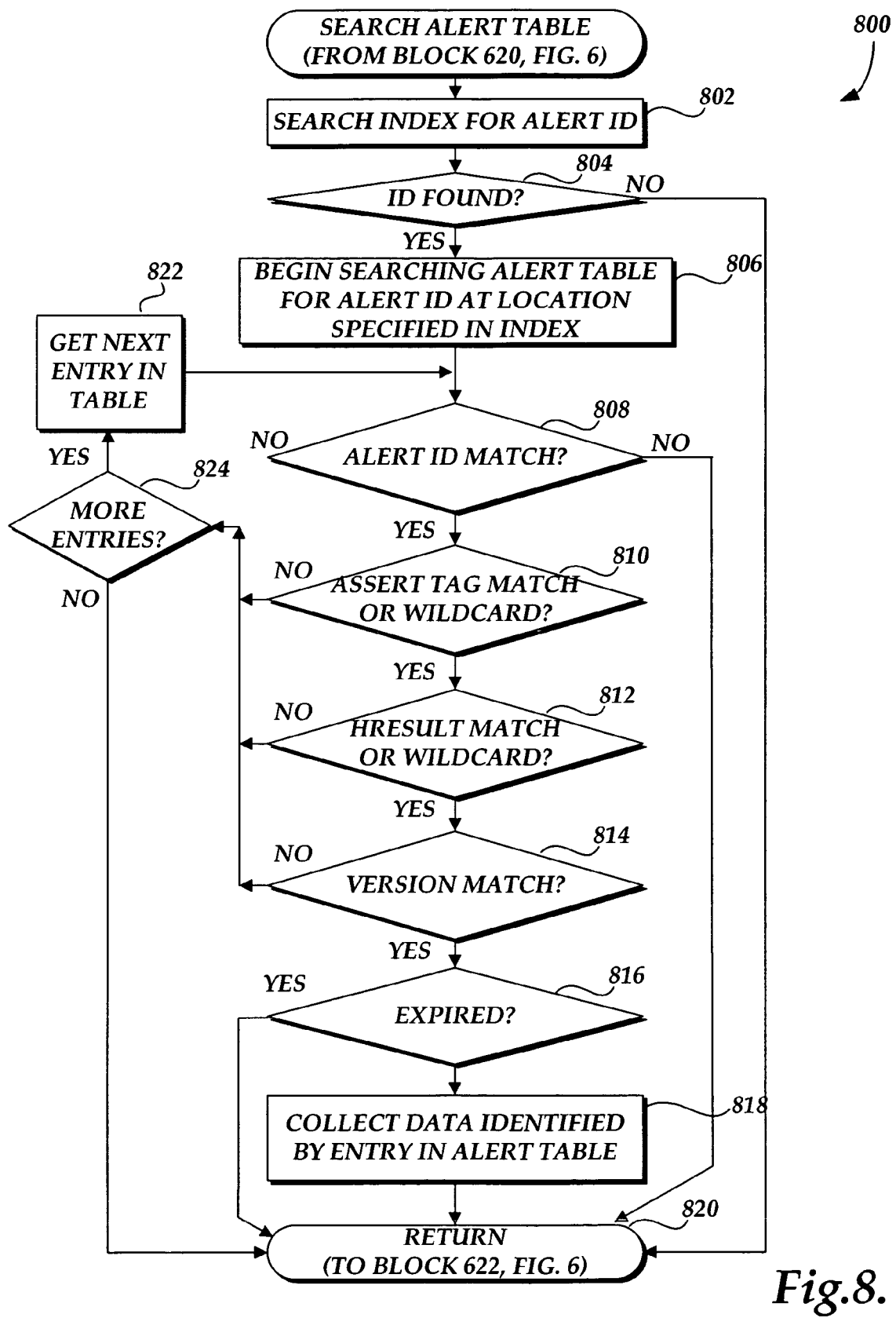
FIG. 8 is a flow diagram illustrating a routine for searching an alert table utilized to identify events that should be reported in one embodiment of the invention.

Referring now to FIG. 8, an illustrative routine 800 will be described for searching the alert table 48 and collecting data regarding the occurrence of an event. The routine 800 begins at block 802, where the alert identifier field 50J is searched for an alert identifier matching the alert of the recently occurring program alert. If no alert identifier is found in the alert index 46, the routine 800 branches to block 820 where it ends. If a matching alert identifier is found in the field 50J, however, the routine 800 continues from block 804 to block 806. At block 806, a search is begun on the alert table 48 at the location specified in the field 50K corresponding to the matching alert identifier in field 50J.

From block 806, the routine 800 continues to block 808, where a determination is made as to whether the alert identifier contained in the field 50L matches the alert identifier of the recently occurring alert. If the alert identifier in the field 50L does not match, the routine 800 branches to block 820.

If, at block 808, it is determined that the alert identifier contained in the field 50L for the current entry matches the alert identifier of the recently occurring alert, the routine 800 continues to block 810. If at block 810, a determination is made as to whether the contents of the assert tag field 50M match the assert tag of the last assert that occurred prior to the program alert or a wildcard. If the contents of the field 50M do not match, the routine 800 branches to block 824. If, however, the contents of the field 50M match the most recently occurring assert, the routine 800 continues to block 812.

At block 812, a determination is made as to whether the contents of the hresult field 50 and match the hresult associated with the most recently occurring program alert or a wildcard. If the hresult does not match, the routine 800 branches to block at 824. If, however, the hresult does match, the routine 800 continues from block 812 to block 814. At block 814, a determination is made as to whether the version of the application program 30 in which the program alert was generated matches the version specified by the fields 50P and 50Q. If the version does not match, the routine 800 branches to block 824. If, however, the versions do match, the routine 800 continues from block 814 to block 816.

At block 816, a determination is made as to whether the date and time specified in the expired fields 50S is later than a current date and time maintained by the client computer 2. If the date is later, the entry in the alert table 48 has expired and the routine 800 branches from block 816 to block 820. If the entry has not expired, the routine 800 continues to block 818, where data is collected regarding the occurrence of the alert as specified in the data wanted field 50R corresponding to the matching entry. The collected data is stored in a location accessible to the reporting engine 24. From block 818, the routine 800 continues to block 820, where it returns to block 622, described above with reference to FIG. 6.

Figure 9:
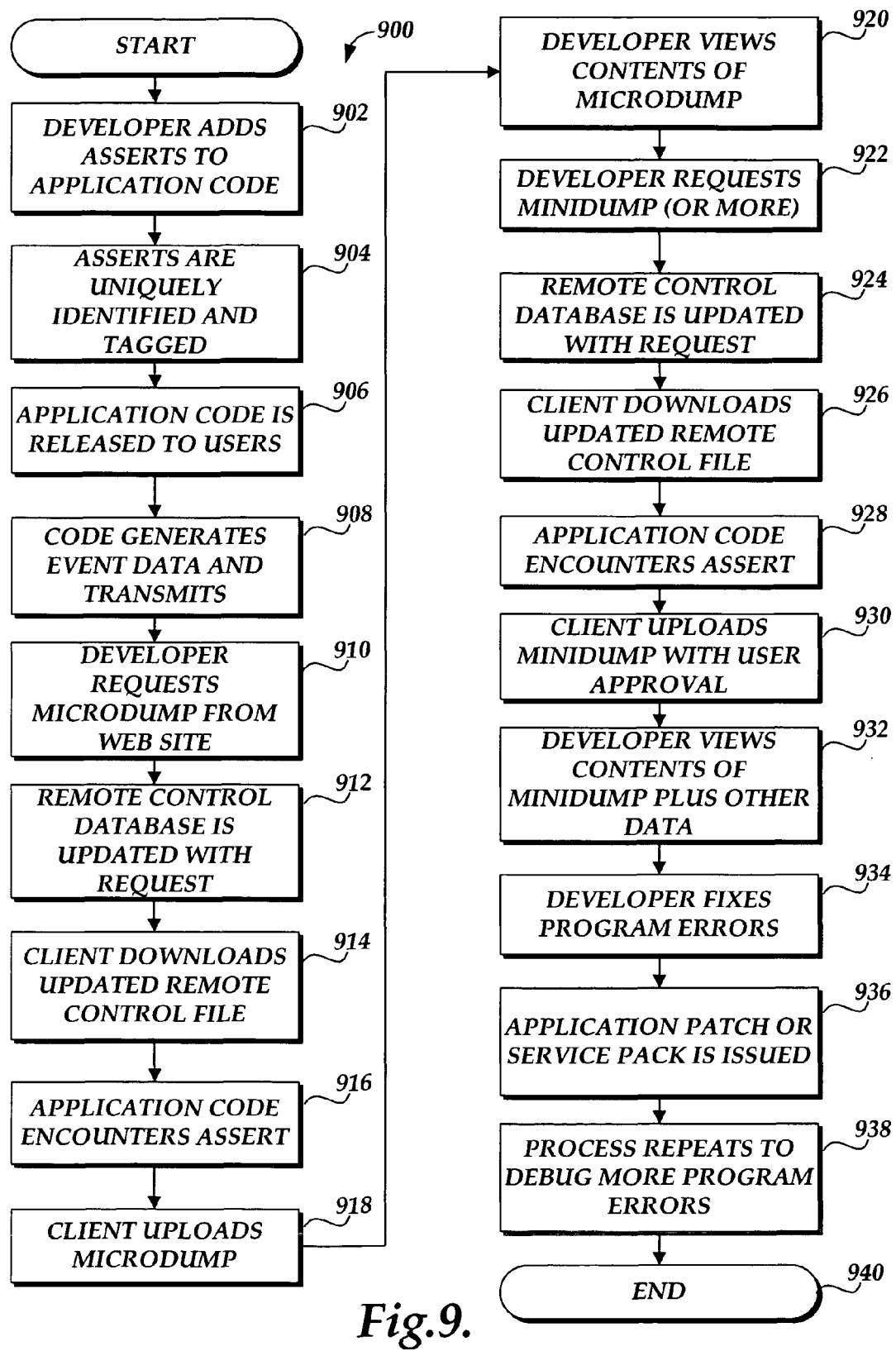
FIG. 9 is a flow diagram illustrating a routine for utilizing remote control of event reporting to debug a software application in one embodiment of the invention.

Referring now to FIG. 9, an illustrative routine 900 will be described illustrating a software development cycle that utilizes the remote control file 26 and the reporting engine 24 to collect information regarding an application program 30 and to utilize that information to debug the application program. The routine 900 begins at block 902, where a developer adds assert code to the application program 30. As known to those skilled in the art, asserts may be implemented utilizing macros in conjunction with a compiler of the application program 30. The routine 900 then continues to block 904, where the asserts are provided unique identifiers. By providing unique identifiers for each assert in either a single application program or multiple application programs, error conditions corresponding to each assert can be uniquely identified.

From block 904, the routine 900 continues to block 906 where the application program 30 is released to users. At block 908, the application program 30 is utilized by the users and may occasionally generate an assert. In response to the occurrence of an assert, the reporting engine 24 may transmit an error report to the error reporting server computer 10 describing the assert. Utilizing the facilities provided by the error reporting server computer 10, the developer may view the error data generated by the application program 30. In order to further debug the application program 30, the developer may request a microdump for the next occurrence of the event from the error-reporting server 10. In order to request such data, the data wanted field 50F is updated in the remote control file 26 for the corresponding assert.

In response to the developer request, the remote control file 26 is updated. At block 914, the software update service 28 downloads the updated remote control file 26 from the error reporting server computer 10. When the assert is subsequently encountered by the application program 30, the remote control file 26 is consulted to determine the type of data that should be reported. As specified by the developer, the microdump is generated and transmitted to the error reporting server computer 10 by the client computer 2 at block 918.

At block 920, the developer may view the contents of the microdump at the error-reporting server 10. If the developer needs additional information, the developer may again modify the contents of the remote control file 26 to indicate that a minidump or additional information be provided in response to the next occurrence of the assert at block 922. At block 924, the remote control file 26 is again updated with the developer's request. At block 926, the client computer 2 downloads the updated remote control file 26. When the assert is again encountered by the application program 30, the reporting engine 24 uploads the requested minidump to the error reporting server computer 10.

At block 932, the developer may view the contents of the minidump or other data generated in response to the most recent occurrence of the assert. At block 934, the developer is able to fix the error that caused the assert to be generated in the application program 30. In particular, the developer may issue a patch to the application program 30 or a service pack that fixes the error. At block 938, the process illustrated by the routine 900 is repeated to debug further errors existing in the application program 30. The routine 900 then continues to block 940, where it ends.

Figure 10:
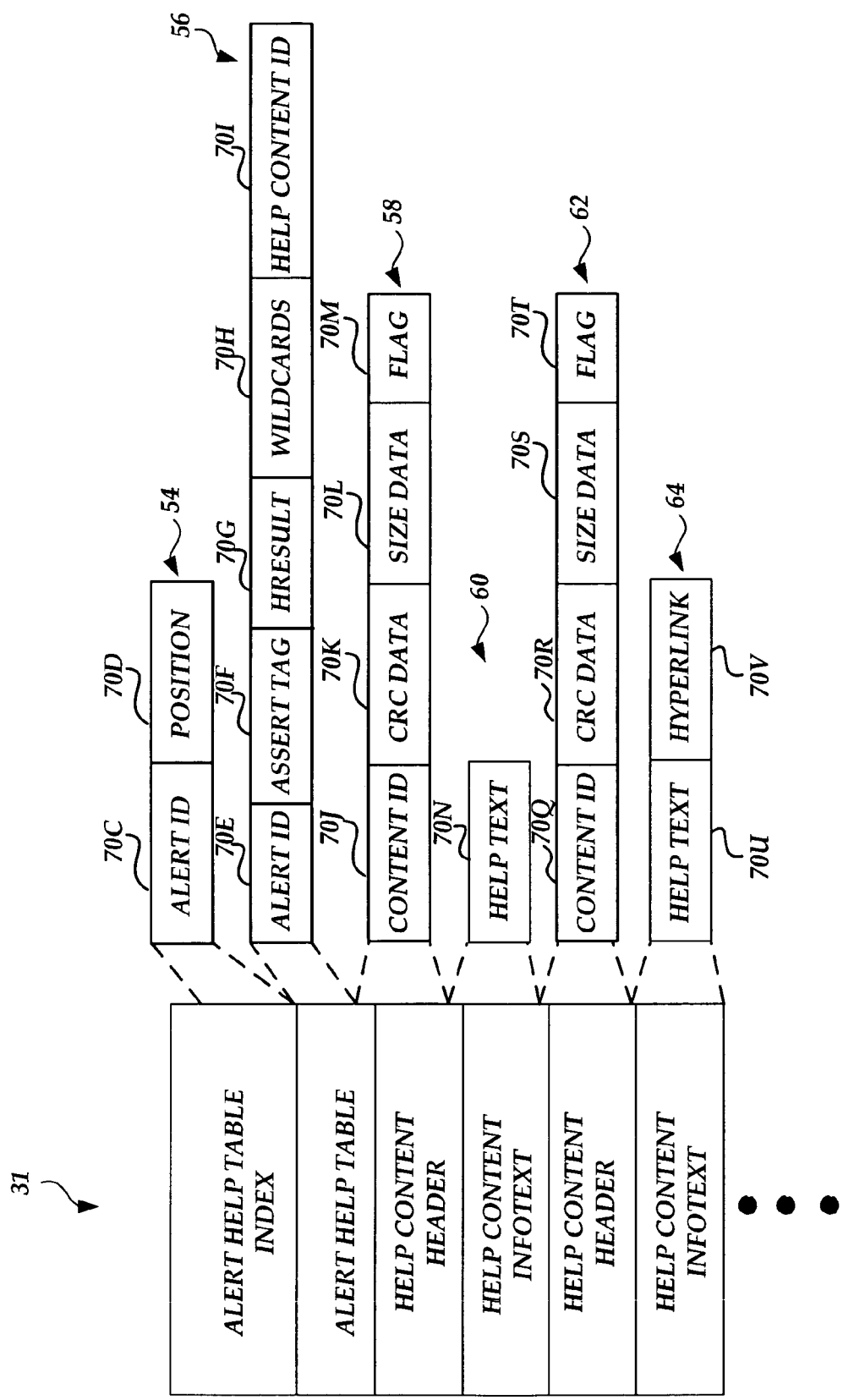
FIG. 10 is a data structure diagram illustrating a structure of an alert help data file utilized in the various embodiments of the present invention.

Referring now to FIG. 10, the various aspects of the alert help data file 31 will be described. As discussed briefly above, the alert help data file 31 is utilized by the client computer 2 to provide help content that is customized and directed toward aspects of a particular event occurring within the client computer 2. In particular, according to one embodiment, the help file is customized toward the occurrence of particular program alerts generated by the application program 30 and occurring within the client computer 2.

The alert help data file 31 also includes an alert help table index 54. The alert help table index 54 includes an alert identifier field 70C and a position field 70D. As discussed above, each alert occurring with the client computer 2 is assigned a unique alert identifier. The field 70C contains the alert identifier corresponding to help content contained in the help data file 31. The position field 70D identifies the position of the alert identifier within the alert help table 56. As will be described in greater detail below, when a program alert occurs, the index is utilized to quickly locate the entry for the alert within the alert help table 56.

The alert help table 56 includes an alert identifier field 70E, an assert tag field 70F, an hresult field 70G, a wildcards field 70H and a help content identifier 70I. The alert identifier field 70E identifies a particular alert corresponding to the program alert occurring within the client computer 2. The assert tag field 70F contains the assert tag corresponding to a program assert that occurred just prior to the generation of the program alert. By keying the help content based on both the alert identifier and the assert tag, very specific help content can be provided for different types of events. Additionally, an hresult may be specified in the field 70G to even further define the circumstances under which a particular help content is provided to a user. As will be discussed in particular detail below, if an alert identifier, assert tag, and hresult correspond to a particular alert, the corresponding help content identifier field 70I is utilized to locate the appropriate content. The wildcards field 70H may be utilized to specify wildcards for the fields 70E, 70F, and 70G.

As shown in FIG. 10, the alert help data file 31 also includes one or more help content headers 58 and 62, and one or more help content infotext resources 60 and 64. A help content header and a help content infotext section are provided for each combination of alert identifiers, assert tags, and hresults specified in the alert help table 56.

The help content header 58 includes a content identifier field 70J, a CRC data field 70K, a size field data field 70L, and a flag field 70M. The content identifier field 70J is utilized to identify the particular help content for a given alert. The CRC data field 70K and the size data field size 70L are utilized to verify the contents of the help content infotext 60 corresponding to the help content header 58. Additionally, the flags field 70M may be utilized to specify variables regarding the help content infotext 60, such as whether the help text is compressed. The flags field 70M may also be used to specify whether the alert should be opened with the infotext showing, and whether the infotext field is empty.

The help content infotext resource 60 includes the actual help content to be displayed to a user. In particular, the help text field 70N comprises the displayable content. The help text 70N may be formatted as extensible hypertext markup language ("XHTML"), rich text, or other type of displayable text or graphics. Additionally, the help text 70N may also include one or more hyperlinks. In this manner, the help text corresponding to a program alert may be utilized to direct a user to information available from other external resources, such as Web sites.

Although the embodiment of the invention described herein refers to providing help content regarding alerts occurring within a computer system, it should be appreciated that similar structures and systems may be utilized to provide detailed help content regarding any type of event occurring within a computer. In particular, similar data structures and systems may be utilized to provide help content regarding the operation of the operating system 16 or other hardware components within the client computer 2.

Figure 11:
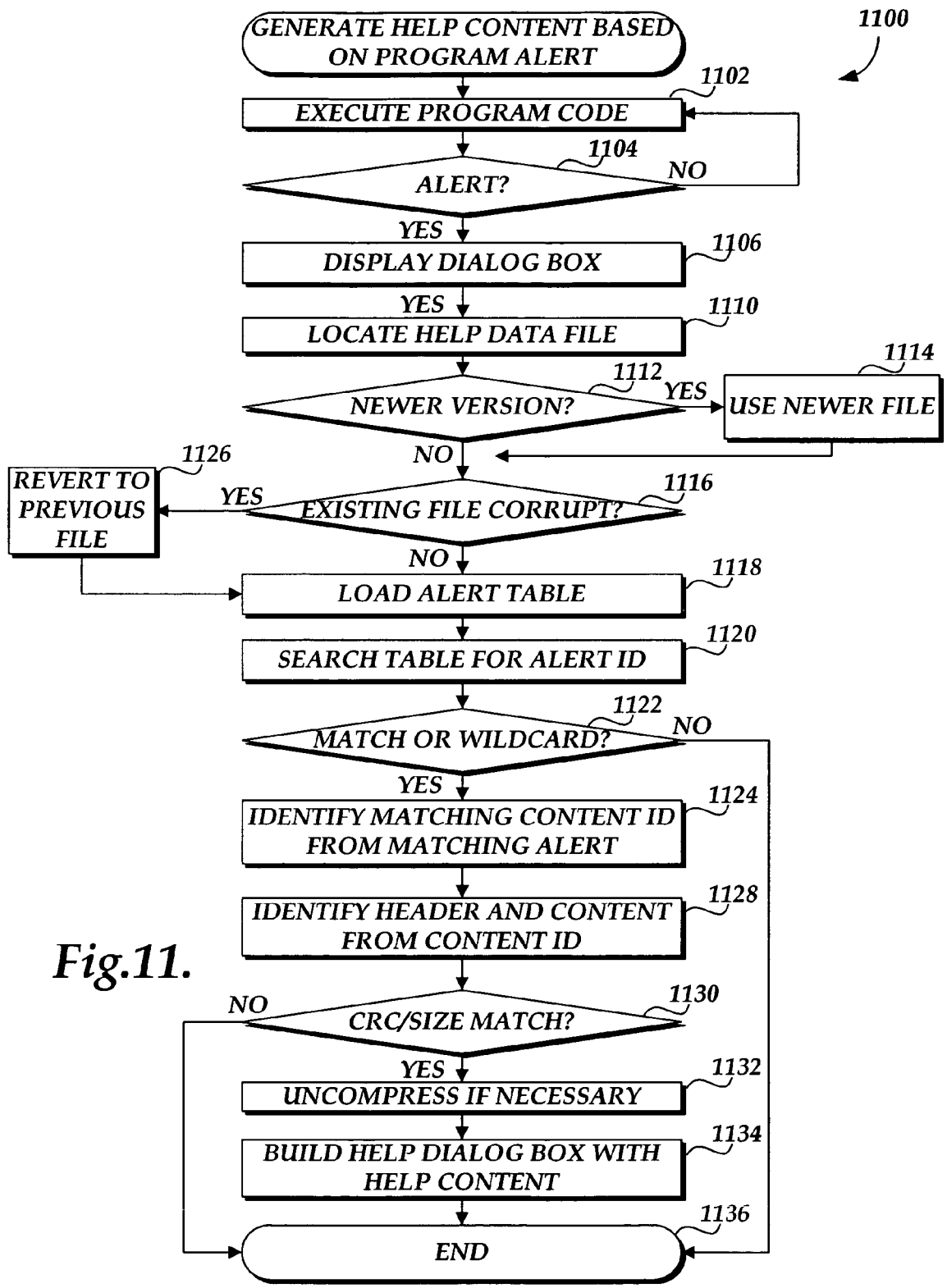
FIG. 11 is a flow diagram illustrating a routine for generating help content based on the occurrence of a program alert according to one embodiment of the invention.
Figure 12:
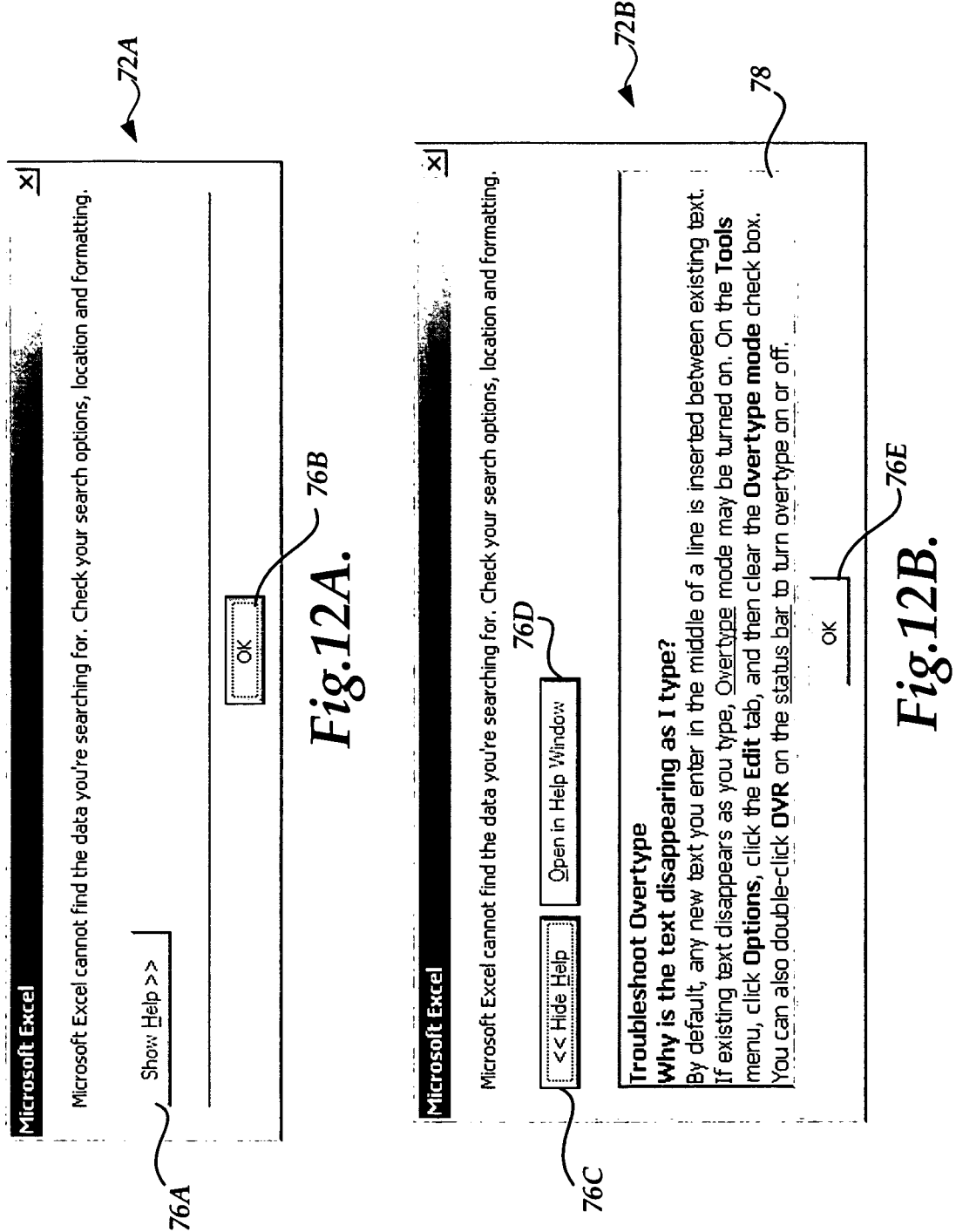
FIGS. 12A-12B are screen diagrams illustrating user interface dialog boxes presented to a user in one embodiment of the present invention.

Referring now to FIG. 11, an illustrative routine 1100 will be described illustrating the operation of aspects of the application program 34 for generating and displaying help content based on the occurrence of a program alert. The routine 1100 begins at block 1102, where the program code of the application program 30 is executed. From block 1102, the routine 1100 continues to block 1104 where a determination is made by the application program 30 as to whether a program alert has been generated. If no alert has been generated, the routine 1100 branches back to block 1102. If, however, an alert has been encountered, the routine 1100 continues to block 1106, where a user interface dialog box is displayed indicating that the alert has been generated and providing a message to a user of the computer 2. Additionally, the dialog box includes a user interface button allowing the user to request additional help regarding the particular occurrence of the alert. An illustrative user interface for such a dialog box will be described in greater detail below with respect to FIGS. 12A-12B.

From block 1106, the routine 1100 continues to block 1110 where the alert help data file 31 is located by the application program 30. Once the alert help data file 31 has been located, a determination is made at block 1112 as to whether a newer version of the help data file 31 is stored on the client computer 2. If a newer version is available on the client computer 2, the routine 1100 branches to block 1114 where the newer version of the alert help data file 31 is obtained. The routine 1100 then continues from block 1114 to block 1116 where a determination is made as to whether the alert help data file 31 is corrupt. This determination may be made by utilizing the CRC and size values contained in the header of the alert help data file 31. If the alert help data file 31 is corrupt, the routine 1100 branches from block 1116 to block 1126 where the version of the alert help data file 31 that shipped with the application is located and utilized. If the file is not corrupt, the routine 1100 continues from block 1116 to block 1118, where the alert help table 56 and the alert help table index 54 are loaded into the memory of the client computer 2.

At block 1120, the alert help table 54 is searched for an alert identifier corresponding to the alert that occurred within the client computer 2. Additionally, a best match search may be performed to also identify within the alert help table 56 an entry having an assert tag corresponding to the assert that occurred just prior to the occurrence of the alert table and a matching hresult, or wildcards. At block 1122, a determination is made as to whether an entry in the alert help table 56 was found that matches the alert identifier. If an alert identifier is found, a determination is made as to whether the matching entry also has a matching entry or wildcard in the assert tag and hresult fields. This process is similar to that described above with reference to blocks 808 through 814 of the routine 800. If no match was found, the routine 1100 branches to block 1136, where it ends.

If, at block 1122, it is determined that a match was found within the alert help table 56, the routine 1100 continues to block 1124. At block 1124, the content identifier stored in the field 70H is identified. The routine 1100 then continues to block 1128, where the help content header 58 and the help content infotext 60 corresponding to the entry in the alert help table 56 is identified. Once the particular help content header 58 and help content infotext 60 have been identified, the routine 1100 continues to block 1130. At block 1130, a determination is made as to whether the help context infotext 60 is corrupt. This may be determined by utilizing the CRC and size data contained in the help content header corresponding to the help content infotext. If the size and CRC values do not match, the routine 1100 branches from block 1130 to block 1136, where it ends.

If the help content infotext 60 is not corrupt, the routine 1100 continues from block 1130 to block 1132. At block 1132, the help content infotext 60 is uncompressed if the flag specified in the field 70M indicates that the data has been compressed. The routine 1100 then continues to block 1134 where a help dialog box is generated including the help content contained in the help content info text resource 60. As will be described in greater detail below with respect to FIGS. 12A-12B, a progressive disclosure may be provided to the user with the help content. Additionally, the user may select hyperlinks contained within the content to navigate to other resources. Additionally, the user may indicate that the help content be displayed within a standard user interface help pane, rather than within the dialog box. Additional details regarding an illustrative user interface will be provided below. From block 1134, the routine 1100 continues to block 1136, where it ends.

Referring now to FIGS. 12A and 12B, an illustrative user interface will be described for providing help content corresponding to the occurrence of a particular alert within the client computer 2. As shown in FIG. 12A, when an alert is encountered, the dialog box 72A may be displayed. The dialog box 72A includes information regarding the event along with a user interface button 76A for showing help content corresponding to the event. If a user selects the user interface button 76A, they are presented with the dialog box 72B shown in FIG. 12B.

Figure 13:
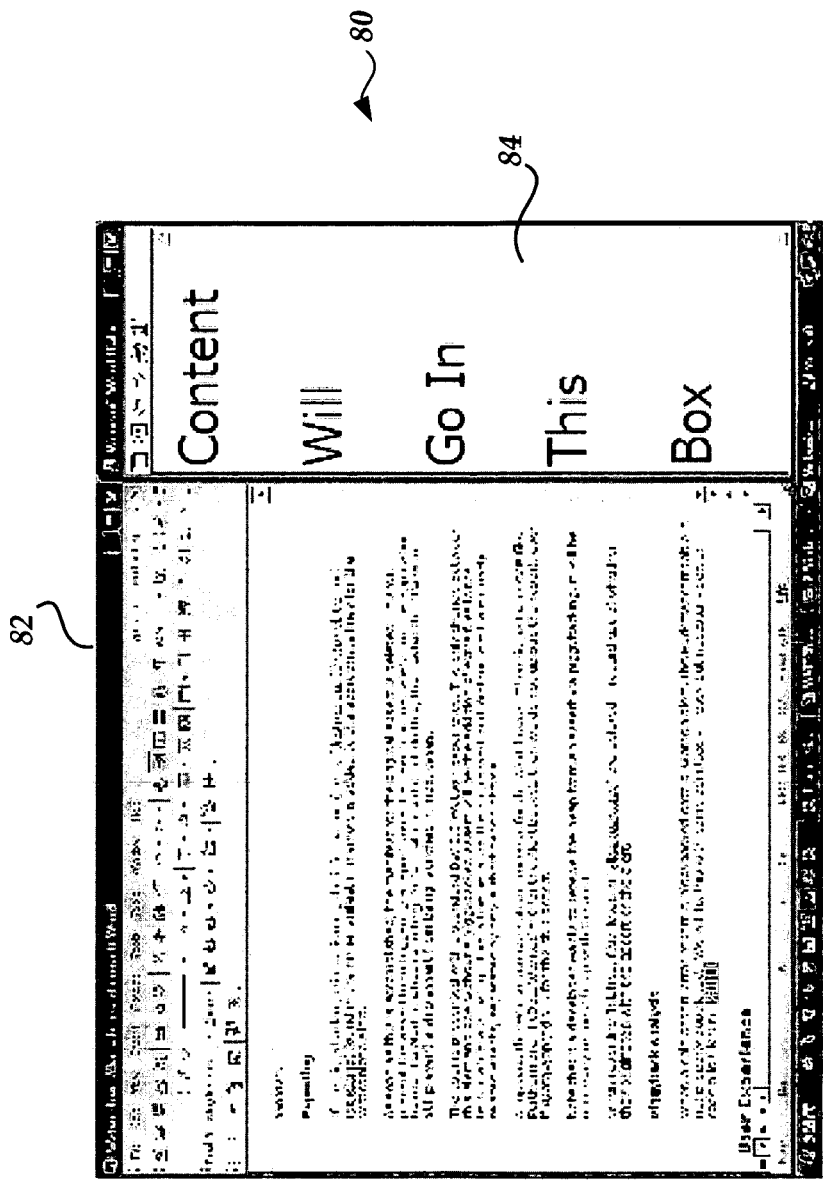
FIG. 13 is a screen diagram illustrating a user interface for providing help content associated with a particular event in a help pane according to one embodiment of the invention.

As shown in FIG. 12B, the dialog box 72B includes a rich text field 78 that includes the additional help content corresponding to the alert contained in the alert help data file 31. As shown in FIG. 12B, the rich text field 78 may include richly formatted text and hyperlinks. If selected, the hyperlinks may launch a Web browser and retrieve a Web site or other resource containing additional information regarding the alert. Additionally, the user may select the user interface button 76D for opening the contents of the rich text field 78 in a standard help pane. FIG. 13 shows a help pane 84 containing the contents of the rich text field 78 being displayed adjacent to an application window 82. At any time, the user may select the user interface button 76B and 76E to close the user interface dialog boxes 72A and 72B, respectively.

Based on the foregoing, it should be appreciated that the embodiments of the invention provide a method and apparatus for providing help content corresponding to the occurrence of an event within a computer. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for providing helpful content associated with a program alert, the method comprising:

periodically retrieving a help file comprising help content associated with at least one parameter uniquely identifying events associated with a client computer, wherein periodically retrieving the help file comprising the help content comprises:

determining whether a current time corresponds to a first appropriate time to execute an update service, the update service being configured to execute by specifying a key in a registry of the client computer, in response to a determination that the current time is the appropriate time to execute the update service, determining whether data collection is permissible based on administrative policies set on the client computer, retrieving an updated version of the help file, and specifying a second appropriate time to execute the update service by updating the key in the registry of the client computer;

generating the program alert;

consulting a remote control file to determine an assert identifying code which identifies an occurred assert associated with the program alert;

determining whether help content should be provided regarding the program alert;

in response to determining that the help content should be provided, identifying the help content based upon an alert identifier associated with the program alert and an assert tag uniquely identifying the occurred assert, the assert tag corresponding to the assert identifying code provided by the remote control file, the help content being based at least on an error report received from at least one other client computer that has previously experienced a similar event and a similar assert, wherein identifying the help content comprises locating the help content from a help table, wherein locating the help content from the help table comprises locating the help content based on a position field in a help index used identifying a position of the alert identifier associated with the help content, and determining whether the help content is corrupt, wherein determining whether the help content is corrupt comprises utilizing cyclic redundancy check (CRC) and utilizing size data contained in a help content header, and in response to determining that the help content is not corrupt, generating a graphical user interface with the help content;

determining whether to flag a program code based upon the assert;

using a computer to display the help content;

determining whether the program alert is a reportable event;

in response to determining that the reportable event has occurred, consulting the help file to determine whether the event should be reported; and if the event is to be reported, collecting data identified by the help file as an event report.

2. The method of claim 1, wherein identifying the help content further comprises identifying the help content based on a function result generated concurrently with the program alert.

3. The method of claim 2, wherein identifying the help content comprises identifying the help content comprising extensible hypertext markup language.

4. The method of claim 3, wherein identifying the help content further comprises identifying the help content comprising a hyperlink to a remotely stored help resource.

5. A system for providing helpful content associated with a program alert, the system comprising:

a memory storage; and a processing unit coupled to the memory storage, wherein the processing unit is operative to:

periodically retrieve a help file comprising help content associated with at least one parameter uniquely identifying events associated with a client computer, wherein the processing unit being operative to periodically retrieve the help file comprising the help content comprises the processing unit being operative to:

determine whether a current time corresponds to a first appropriate time to execute an update service, the update service being configured to execute by specifying a key in a registry of the client computer, in response to a determination that the current time is the appropriate time to execute the update service, determine whether data collection is permissible based on administrative policies set on the client computer, retrieve an updated version of the help file, and specify a second appropriate time to execute the update service by updating the key in the registry of the client computer;

generate the program alert;

consult a remote control file to determine an assert identifying code which identifies an occurred assert associated with the program alert;

determine whether help content should be provided regarding the program alert;

in response to determining that the help content should be provided, identify the help content based upon an alert identifier associated with the program alert and an assert tag uniquely identifying the occurred assert, the assert tag corresponding to the assert identifying code provided by the remote control file, the help content being based at least on an error report received from at least one other client computer that has previously experienced a similar event and a similar assert, wherein identifying the help content comprises locating the help content from a help table, wherein locating the help content from the help table comprises locating the help content based on a position field in a help index used identifying a position of the alert identifier associated with the help content, and determine whether the help content is corrupt, wherein determining whether the help content is corrupt comprises utilizing cyclic redundancy check (CRC) and utilizing size data contained in a help content header, and in response to determining that the help content is not corrupt, generate a graphical user interface with the help content;

determine whether to flag a program code based upon the assert;

use a computer to display the help content;

determine whether the program alert is a reportable event;

in response to determining that the reportable event has occurred, consult the help file to determine whether the event should be reported; and if the event is to be reported, collect data identified by the help file as an event report.

6. The system of claim 5, wherein the processing unit being operative to identify the help content further comprises the processing unit being operative to identify the help content based on a function result generated concurrently with the program alert.

7. The system of claim 6, wherein the processing unit being operative to identify the help content comprises the processing unit being operative to identify the help content comprising extensible hypertext markup language.

8. The system of claim 7, wherein the processing unit being operative to identify the help content further comprises the processing unit being operative to identify the help content comprising a hyperlink to a remotely stored help resource.

9. A non-volatile storage device that stores a set of instructions which when executed perform a method for providing helpful content associated with a program alert, the method executed by the set of instructions comprising:

periodically retrieving a help file comprising help content associated with at least one parameter uniquely identifying events associated with a client computer, wherein periodically retrieving the help file comprising the help content comprises:

determining whether a current time corresponds to a first appropriate time to execute an update service, the update service being configured to execute by specifying a key in a registry of the client computer, in response to a determination that the current time is the appropriate time to execute the update service, determining whether data collection is permissible based on administrative policies set on the client computer, retrieving an updated version of the help file, and specifying a second appropriate time to execute the update service by updating the key in the registry of the client computer;

generating the program alert;

consulting a remote control file to determine an assert identifying code which identifies an occurred assert associated with the program alert;

determining whether help content should be provided regarding the program alert;

in response to determining that the help content should be provided, identifying the help content based upon an alert identifier associated with the program alert and an assert tag uniquely identifying the occurred assert, the assert tag corresponding to the assert identifying code provided by the remote control file, the help content being based at least on an error report received from at least one other client computer that has previously experienced a similar event and a similar assert, wherein identifying the help content comprises locating the help content from a help table, wherein locating the help content from the help table comprises locating the help content based on a position field in a help index used identifying a position of the alert identifier associated with the help content, and determining whether the help content is corrupt, wherein determining whether the help content is corrupt comprises utilizing cyclic redundancy check (CRC) and utilizing size data contained in a help content header, and in response to determining that the help content is not corrupt, generating a graphical user interface with the help content;

determining whether to flag a program code based upon the assert;

using a computer to display the help content;

determining whether the program alert is a reportable event;

in response to determining that the reportable event has occurred, consulting the help file to determine whether the event should be reported; and if the event is to be reported, collecting data identified by the help file as an event report.

10. The non-volatile storage device of claim 9, wherein identifying the help content further comprises identifying the help content based on a function result generated concurrently with the program alert.

11. The non-volatile storage device of claim 10, wherein identifying the help content comprises identifying the help content comprising extensible hypertext markup language.

12. The non-volatile storage device of claim 11, wherein identifying the help content further comprises identifying the help content comprising a hyperlink to a remotely stored help resource.

* * * * *